(12) United States Patent
Panabaker et al.

(10) Patent No.: US 7,603,436 B2
(45) Date of Patent: Oct. 13, 2009

(54) DATA CAPTURE AND FUSION FROM A POPULATION OF DEVICE USERS

(75) Inventors: Ruston John David Panabaker, Bellevue, WA (US); Eric Horvitz, Kirkland, WA (US); Gregory Baribault, Lynnwood, WA (US); Miller Thomas Abel, Mercer Island, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 11/561,376

(22) Filed: Nov. 17, 2006

(65) Prior Publication Data

US 2008/0120306 A1 May 22, 2008

(51) Int. Cl.
*G06F 15/16* (2006.01)
*G06F 13/14* (2006.01)
(52) U.S. Cl. .......................... 709/217; 711/148
(58) Field of Classification Search ........................ None
See application file for complete search history.

(56) References Cited

U.S. PATENT DOCUMENTS

| | | | |
|---|---|---|---|
| 6,850,269 B2* | 2/2005 | Maguire | 348/149 |
| 6,985,169 B1 | 1/2006 | Deng et al. | |
| 2003/0020950 A1 | 1/2003 | Hunter | |
| 2003/0069800 A1 | 4/2003 | Marshall et al. | |
| 2004/0198313 A1 | 10/2004 | Chiu | |
| 2005/0021494 A1 | 1/2005 | Wilkinson | |
| 2006/0026649 A1 | 2/2006 | Shieh | |

FOREIGN PATENT DOCUMENTS

| | | |
|---|---|---|
| GB | 2 399 715 A | 9/2004 |
| WO | WO 2006/041734 A2 | 4/2006 |
| WO | WO 2006/048613 A1 | 5/2006 |

OTHER PUBLICATIONS

Todd D. Hodes et al. "Composable ad hoc location-based services for heterogeneous mobile clients", Wireless Networks, Oct. 1999, pp. 411-427, vol. 5, Issue 5.
Dr. Rongxing Li "Mobile Mapping—An Emerging Technology For Spatial Data Acquisition", Department of Civil and Environmental Engineering and Geodetic Science, The Ohio State University, 1997.
Marc Davis et al. "MMM2: Mobile Media Metadata for Media Sharing", In Chi '05: Chi '05 extended abstracts on Human factors in computing systems, 2005, pp. 1335-1338.

* cited by examiner

*Primary Examiner*—Gary Portka

(57) ABSTRACT

A method and system is provided for capturing data from a population of device users with network access. A requestor may request a data capture. The requested data may include, for example, a geographical location or a desired subject matter. Devices capable of providing the requested data capture are identified and requested to provide the data. The devices may be identified based on location, capabilities, availability, etc. The data capture from the identified federated devices may be sent to the requestor. The data may be exchanged for a fee, determined by prearrangement or via an economic model such as a competitive auction.

20 Claims, 4 Drawing Sheets

DATA CAPTURE AND FUSION FROM A POPULATION OF DEVICE USERS

BACKGROUND

Mapping has been shown to be helpful for visualizing different geographical locations or images of desired subject matter. Images may be obtained from a geographical location and stored in a computer database. Users may access the database at a subsequent time to obtain the images to view the geographical location. For example, an individual may be planning a trip to a particular location and may wish to obtain images of that location prior to traveling. The individual may then access the database to obtain images of the location.

However, the images in the database have been captured in advance. Depending on the efficiency of updating of the images in the database, the images may be such that they no longer accurately reflect the state of the location of interest. If the location has been changed significantly after the images were stored in the database, the images may be outdated. This is particularly true in today's world in which new structures are frequently being erected as old structures are removed or otherwise altered.

Likewise, an individual may wish to obtain images of recent trends of a particular subject matter. For example, the individual may wish to obtain images of the most recent style of clothing as worn by people in a certain locale or the individual may wish to obtain images of a particular person as the person appears now. The individual may be able to access a database of images (e.g., a stock photography database), however, the images in the database may be outdated if the images were obtained a long time prior. Hence, the individual would be unable to obtain up-to-the-minute information as desired.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a system mediates requests between users of federated devices in a network. The system may track a location of a device and identify the device as capable of providing a desired data capture. The device may be identified based on, for example, location or capabilities.

In another example, a method for soliciting data capture from a device is provided. A location of the device or plurality of devices is determined. Based on a request received from a requester, a device may be determined to be capable of providing data capture desired by the requester. A message may be sent to the determined device to request the data capture.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A method and system for federating user devices in a network for data capture is described. The network may include any federated user devices such as any device for use in surveyed locations (attended or unattended) or mobile devices including PDAs, cell phones, laptop computers, portable computing devices, wireless devices, etc. One example of a device in a surveyed location includes, for example, a weather measurement station. The weather measurement station may be located at an unattended location such as a rooftop of an office building. Weather reports may be received at the weather measurement station via the federated network and may be reported and used, for example, in pre-flight planning or in-flight routing for aircraft.

Figure 1:
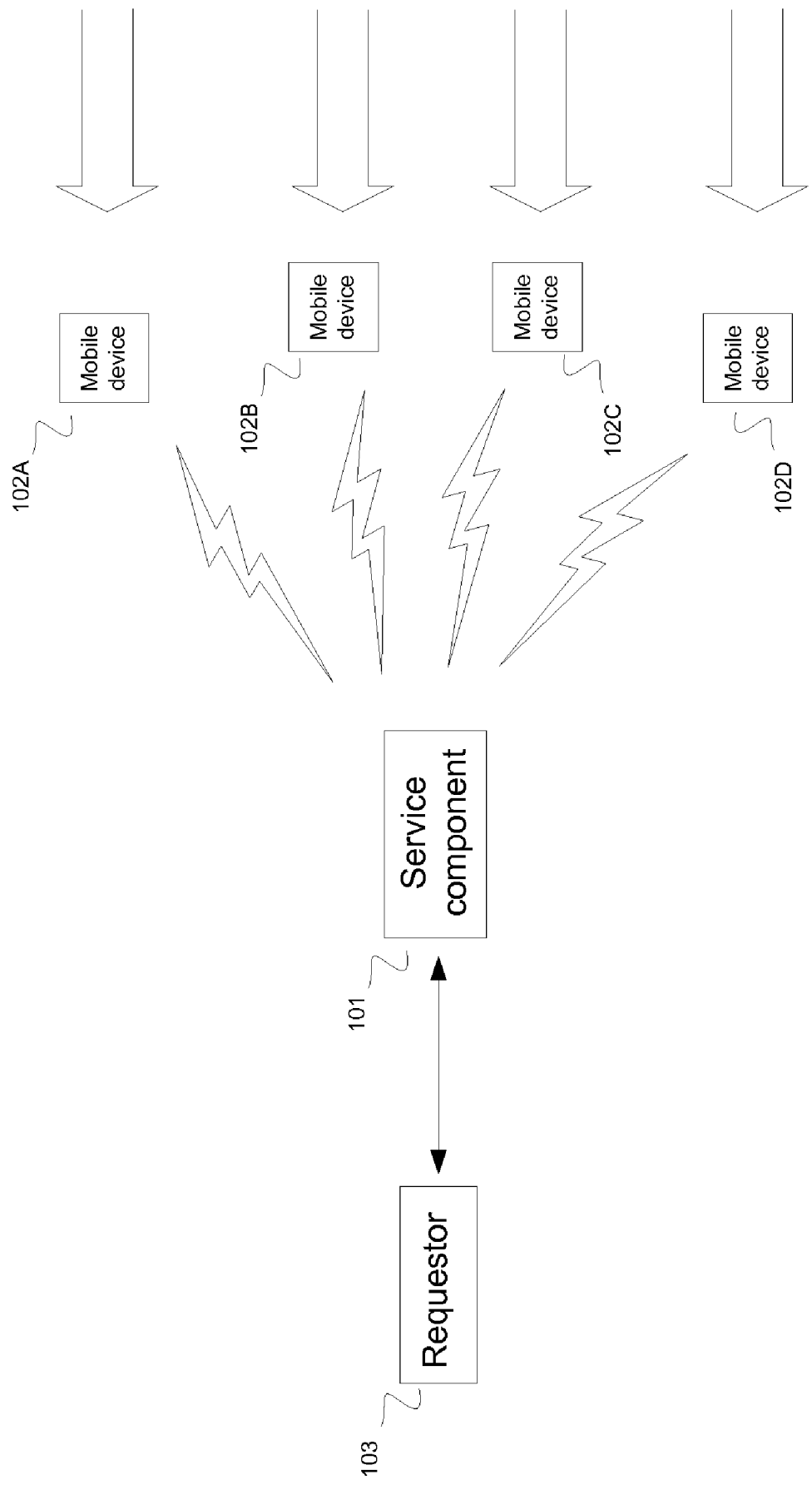
FIG. 1 is a partial block diagram illustrating a network of federated devices.

FIG. 1 is a partial block diagram illustrating a network of federated devices. A service component 101 communicates with any number of devices in the network. FIG. 1 illustrates four mobile devices (102A, 102B, 102C, 102D) as included in the network, however, any number of devices or any type of device may be federated in the network. Also, the devices may include a device in a surveyed location such as a weather measurement station for receiving and/or reporting weather conditions. The service component 101 may communicate wirelessly with any of the mobile devices (102A, 102B, 102C, or 102D) and may further communicate with a requestor 103. The requestor 103 transmits a request to the service component 101 for data and may also be any type of device capable of communicating in a network. For example, the requestor 103 may include a telephone, computer, wireless device, PDA, etc.

Figure 2:
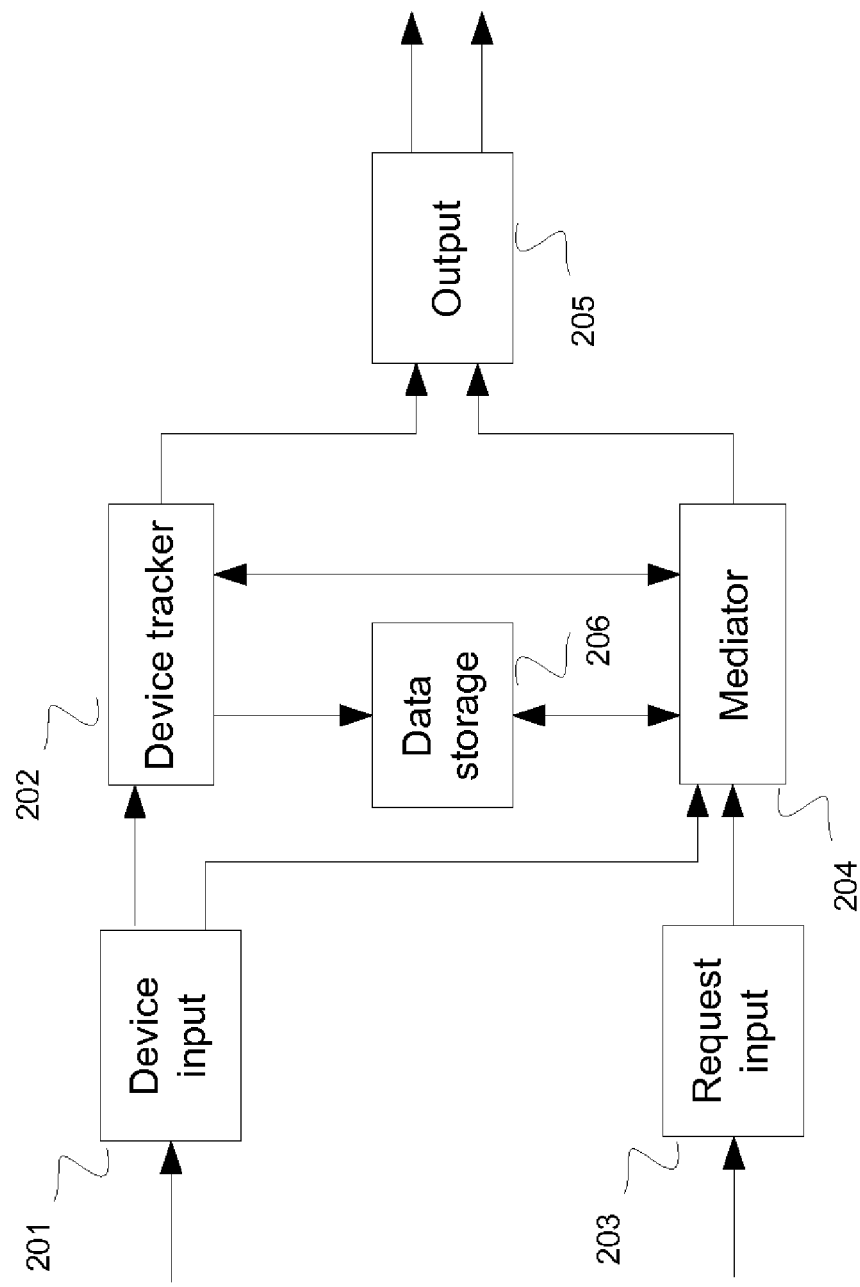
FIG. 2 is a partial block diagram illustrating an example of the service component of FIG. 1.

FIG. 2 is a partial block diagram illustrating an example of the service component 101 of FIG. 1. The service component 101 contains a device input 201 which may receive information from the mobile devices (102A, 102B, 102C, or 102D) in the network. In one example, the service component 101 receives location data pertaining to any of the mobile devices (102A, 102B, 102C, or 102D) such that the location of the mobile devices is known to the service component 101. Such tracking data may be processed in the device tracker 202 and may be stored in the data storage 206. If a mobile device or any other device in the network changes position or location, the updated location information may be received at the device input 201 and may be updated and stored in the data storage 206.

The service component 101 may also receive a request from a user or requestor via the request input 203. The request received at the request input 203 may contain a request for data pertaining to a particular location, particular subject matter or person or any other desired information. In addition, the request may include additional information pertaining to the acquisition of the data such as, for example, a price that the requestor is willing to pay for the data, a minimum, maximum, or desired number of responses to the request, a duration of the offer or request for the data (e.g., the time during which the need for the data exists), type of transaction desired, etc.

The service component 101 may further include a mediator 204 for mediating user requests for data capture and user responses to the requests. For example, a user or requestor may transmit a request for capture of data of a particular location (e.g., a request for visual images or audio corresponding to the desired location) to the service component 101 via the request input 203. The mediator 204 accesses the data storage 206 to obtain information on devices located at the desired location. The mediator 204 may further transmit a message via the output 205 to any device identified as being located at or near the desired location to request data from the devices. In this example, the mediator 204 may request the devices to provide images, audio or other data from the desired location or generate information as to how the data may be captured (e.g., direction in which a device should point to capture the desired data). In addition, other criteria may be assessed for each of the devices to determine if the devices may provide the requested data. For example, a device may further be selected to provide the requested data based on capabilities of the devices or preferences of the user corresponding to each of the devices.

The mediator 206 may receive a request for data capture from a desired location via the request input 203 from a requestor. Devices identified as being at or near the desired location may be identified or polled by the mediator via the output 205 to determine the location of the devices in real-time. The service component 101 may also receive location information of the devices in real-time via the device input 201. The location information may be processed by the mediator 204 such that the location of the devices may be matched to the desired location received via the request input 203 from the requestor. The mediator 204 may transmit a message to the devices identified at or near the desired location in real-time via the output 205 to request data capture from the devices. In addition, the message may include information for the devices for local positioning and other local actions for obtaining the requested data. For example, the mediator 204 may transmit instructions to a device regarding a direction in which to face to obtain the image or a direction and distance in which the user should move in order to obtain the requested data.

The user may be unaware of the presence of a desired object or scene. The mediator 204 may indicate to the user of the device the desired object/scene and may further provide a direction in which to point the device. This informs the user of the device in which direction to point the device and may assist the user to identify the desired object/scene. The device may receive any of this information and display the information to the user of the device. Based on this information, the user may be able to position the device in the proper location and in the proper orientation.

The mediator 204 can include a component that performs a cost-benefit analysis, considering the overall needs for obtaining different potential sources of data and the cost of the data in terms of dollars, time, or effort. Such an analysis can consider multiple properties or attributes of the data that is promised or expected from sensors from different devices and users. Any relevant property may be used. Some non-limiting examples of such properties include the nature of the media (e.g., full video versus intermittent snapshots versus a single still photo), the overage, viewpoints and focus of attention of a device, the resolution of the data, the reliability of the sensors, the configurability, the timeliness of response to a request, and the cost of accessing the sensor(s). The output of the mediator may be a plan or conditional plan for accessing the data that is modified incrementally as data is collected, collated, and combined.

The devices may contain sensors for capturing data. The sensors may be of any type including, for example, cameras, audio recorders, etc. In addition, the devices may further contain tracking devices such that the whereabouts of the devices may be determined by the service component 101. Each user associated with each of the devices may be roaming at various locations and are each located at a particular location at a given time. The service component 101 may track the location of any of the devices via the tracking device in the devices. Alternatively, the devices need not contain tracking devices and the service component 101 may query the location of the devices as needed.

In addition, the service component 101 may obtain additional information of any of the devices and may store the additional information in device profiles at the service component 101, for example, in data storage 206 of the service component 101. The additional information may include any desired information of the devices such as capabilities of the device (e.g., type of sensors, memory capabilities, etc.), preferences of the user associated with a respective device, availability, etc. The mediator 204 may further mediate the data requests received via the request input 203 from the requestor with characteristics of any of the devices and associated users. For example, if the requestor desires audio data from a desired location but a particular device is not equipped with an audio sensing device, then the mediator, based on the data profile corresponding to the device in data storage 206, may select devices based on the information from the device profile. In this example, the mediator would not select the device without an audio sensing device.

Figure 3:
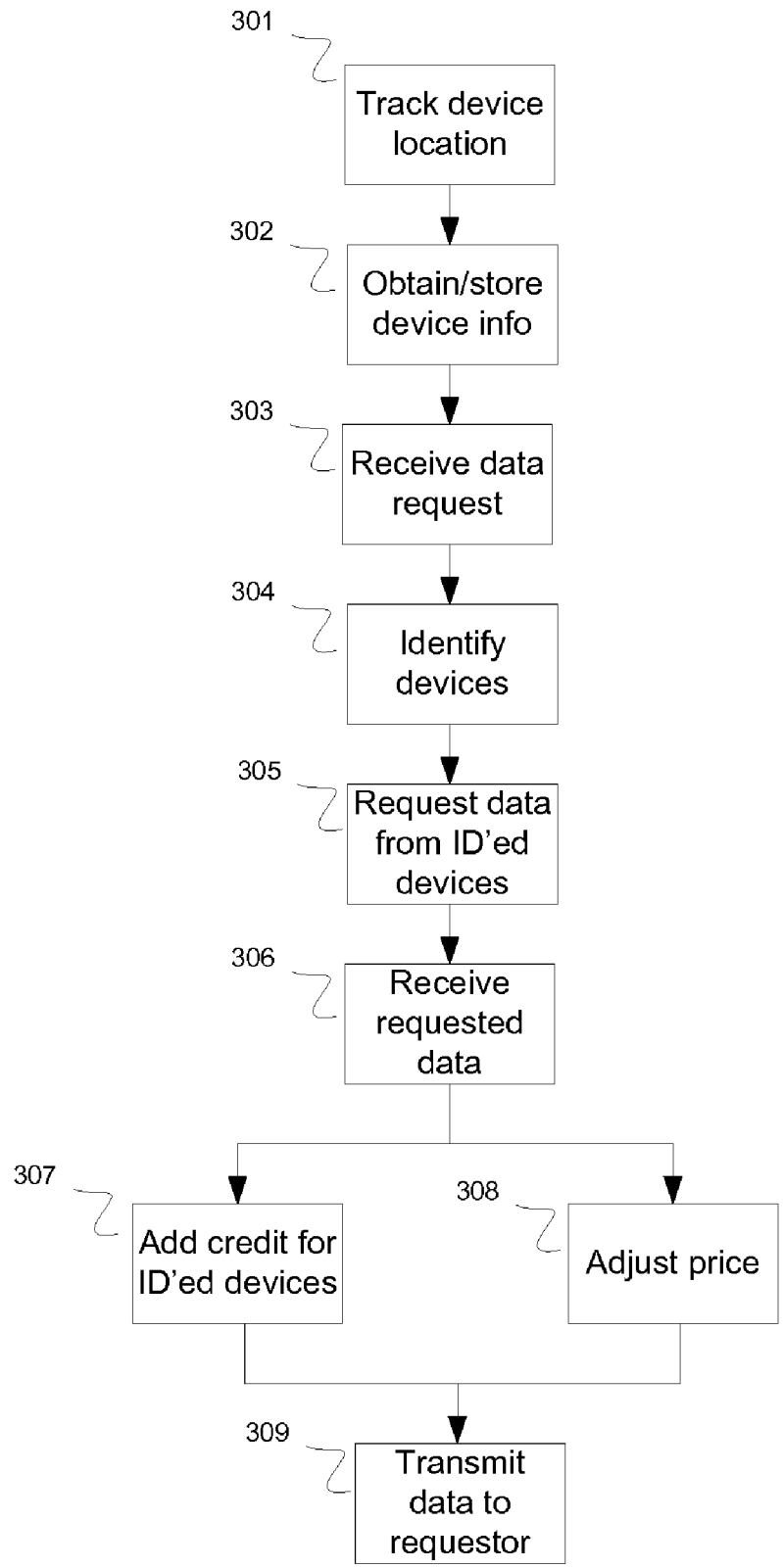
FIG. 3 is a flowchart illustrating an example of data capture among federated devices in a network.

FIG. 3 is a flowchart illustrating an example of data capture among federated devices in a network. A service component 101 may track the location of devices in the network (STEP 301). Location tracking may be performed via a tracking device located at each of the devices in the network or may be performed by any other means such as querying devices for location information or receiving location information from devices in real-time. The location information may be collected at the service component 101 and stored in data storage 206 within the service component 101 (STEP 302). Alternatively, the data may be stored remotely.

The service component 101 may receive a request for data capture from a requestor (STEP 303). The request may include a request for images and/or sounds of a desired location. Alternatively, the request may be for a particular object, item or subject matter regardless of location. For example, the requestor may desire images of a type of monument, a hot air balloon, a particular type of car or airplane, a particular person, etc. In another example, the requestor may request data from a geographical location by providing input on a map. A user interface may be provided on the requestor's device, the user interface including a map. The requestor may select a map of a desired area or location and may interact with the map to request or set the location of the request. In addition, the map may provide additional information relevant to the requestor such as results of a search, serviceable areas, other related areas in the vicinity of or remote from the desired location.

In another example, the request may include a natural language query of interest to the requestor. For example, a requestor may inquire about "what are the weather conditions in New York City?" or "what are people wearing in Paris these days?" In this example, the service component 101 may parse the natural language query to determine the nature of the inquiry. Based on the results of the parsing of the query, the service component 101 may identify devices capable of providing the requested information. In one example of parsing of the query, the service component may identify keywords in the query and match the keywords to a database of keywords maintained at the service component 101. The database of keywords may include keywords that can be used to identify corresponding network devices for providing data pertaining to the keywords.

For example, a requestor may inquire as to the weather conditions in New York City. In parsing the inquiry, the service component 101 may identify keywords such as "weather" and "New York City". Cross-reference tables may also be used to identify other keywords associated with the identified keywords. For example a cross-reference table stored at the service component 101 may contain "New York City" cross-referenced with "Manhattan", "Queens", "Brooklyn", "Bronx", "Staten Island" or even "Long Island" or "New Jersey". The keyword "weather" may be cross-referenced with other keywords as well, such as "temperature", "precipitation", "pressure", "cold front", etc. Hence, additional keywords may be identified from the initial inquiry to assist in identifying. Any of the keywords may be used to identify federated devices in a network for providing the information requested. In this example, devices located in New York City or surrounding areas may be identified as matching the keyword "New York City" or related cross-referenced keywords. Hence, a request for information may be sent to these identified devices.

Figure 4:
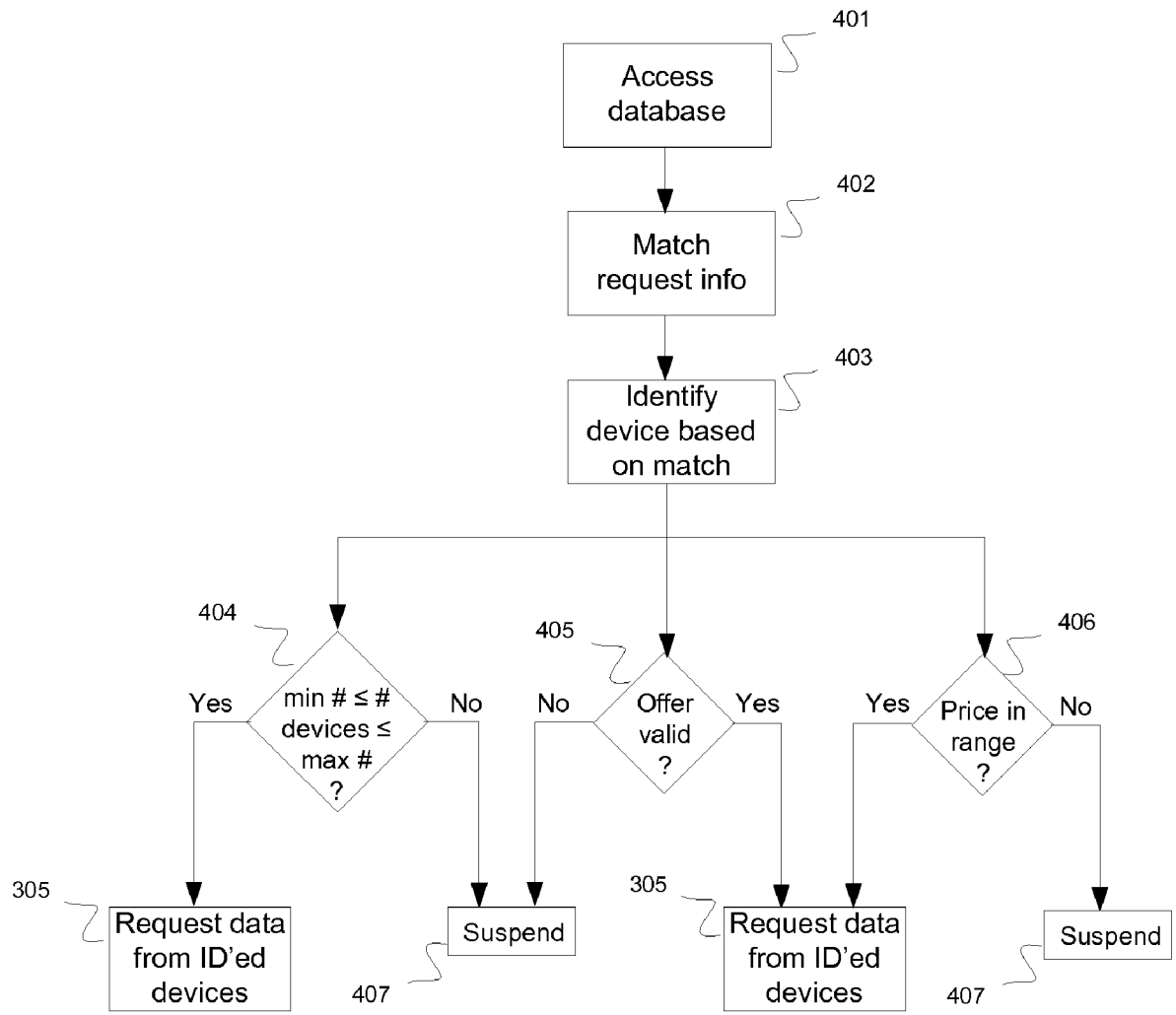
FIG. 4 is a flowchart illustrating examples of identifying devices for providing desired data.

Hence, the service component 101 receives the request from the requestor and identifies devices that may provide the desired data (STEP 304). FIG. 4 is a flowchart illustrating examples of identifying devices for providing desired data. In one example, the service component 101 accesses a database (STEP 401) such as data storage 206 of FIG. 2. The database may include, for example, location information of the devices and/or additional information on each of the devices in the network such as capabilities of the devices or preferences of the users of the devices. The information on the devices may be matched with the received data capture request (STEP 402). Based on the information on the devices, devices may be identified that may provide the desired information (STEP 403). For example, if the request is for images of hot air balloons, the mediator 204 of the service component 101 may select devices which are equipped with image sensors and located in the vicinity of a hot air balloon. If a device is not in the vicinity of a hot air balloon or is not equipped with an image sensor (e.g., camera), then the device is not identified as a device that may provide the desired data. In another example, the service component 101 may query the device or the user of the device may indicate the capability of providing the information. In this case, the updated information would override stored data in the data storage 206.

In addition, the requestor may provide in the request a number of devices desired for capturing the desired data. For example, the requestor may indicate in the request that a particular minimum and/or maximum number of devices is desired for providing the requested information. In this case, a requestor may desire a certain level of detail of the desired information or a multitude of perspectives of the data. For example, if a requestor desires an image of an airplane, the requestor may transmit a message to the service component 101 requesting images of the airplane. However, the requestor may further desire at least a front view, side view, and back view of the aircraft. Thus, the user provides a minimum number of devices desired so that the requestor may receive at least the desired number of images. In another example, the requestor may wish information of a scene of an event in which multiple images may be helpful in providing sufficient data from the scene. For example, the requestor may wish to obtain information on a scene of a fire or other disaster. The requestor may be, for example, a dispatcher and may wish to ascertain the conditions at the scene such that emergency personnel may be dispatched properly equipped with the knowledge of the situation at the scene. This advance knowledge may assist the emergency personnel to manage the situation. Thus, the requestor may request a minimum number of images of the scene or may indicate that all available images are desired. Conversely, a user may wish to receive a smaller number of images and may wish to limit the number of images received. In this case, the requestor may specify in the transmitted message the maximum number of devices desired.

As FIG. 4 illustrates, in one example, the mediator 204 may determine the number of devices capable of providing the desired information and compare the number of such devices to a minimum and/or maximum number of devices specified in the request from the requester. If the number of devices is greater than or equal to a minimum number of desired devices and/or less than or equal to a maximum number of desired devices ("YES" branch of STEP 404), then the service component 101 may request data from the identified devices (STEP 305). If the number of desired devices is less than the minimum number of desired devices and/or greater than the maximum number of desired devices ("NO" branch of STEP 404), then the data capture is suspended (STEP 407) such that the service component does not request the data capture from the devices. Alternatively, the service component 101 may notify the requestor that the number of devices is out of the desired range. The requestor may approve or disapprove the data capture as desired.

If the number of desired devices exceeds the maximum number, the service component 101 may alternatively notify the requestor to select a subset of the devices. The service component 101 may also select a subset of devices based on factors such as previous preference information of the requestor, previous reliability of the devices (i.e., if a device previously provided poor quality data or was unreliable in performance, the service component 101 may eliminate the device from the pool of devices if the number of devices exceeds the desired maximum number), or any other desired criteria.

Alternatively, the price of the data capture may be based on the number of devices available to provide the requested data. A requestor may transmit a request for data capture of desired subject matter for a particular price to the service component 101. The service component 101 may identify devices capable of providing the requested data. Based on the number of devices identified as capable (or willing) to provide the data, the price requested by the requestor may be adjusted. For example, the price may be increased above the price indicated by the requestor if the number of devices identified by the service component 101 is lower than a predetermined number. Conversely, the price may be decreased below the price indicated by the requestor if the number of devices identified by the service component 101 is higher than the predetermined number.

In another example, the requestor may place further restrictions on the data capture such as time for producing the desired data. In this example, the requestor may desire particular data at a certain time or no later than a certain time. The requestor includes in the request data indicating the latest time the data is desired so that after the indicated time, the data capture is suspended. As illustrated in FIG. 4, when the offer is valid ("YES" branch of STEP 405), the service component 101 requests data capture from identified devices. However, when the offer is no longer valid (e.g., the time for providing the data has elapsed) ("NO" branch of STEP 405), then the data capture is suspended (STEP 407). Alternatively, the service component 101 may send a message to the requestor indicating that the time has elapsed. If the requestor wishes to obtain the data anyway, the requestor may modify the request to state a new deadline or indicating that no deadline exists.

In yet another example, the requestor may provide in the request a desired price or price range for the data. Based on the desired price or price range, devices may be selected based on ability to provide the data for the desired price. As illustrated in FIG. 4, the request from the requestor may include a price that the requestor is willing to pay for the data (STEP 406). The service component 101 may further include information on the price charged by the devices for providing the requested data. For example, the service component 101 may poll the identified devices and receive messages responsive to the poll from the devices indicating the charged prices for each of the devices. Alternatively, the service component 101 may obtain pricing information from the devices prior to the request and may store the pricing information for each of the devices in a device profile in data storage 206.

The service component 101 may compare the price(s) the requestor is willing to pay with the price(s) charged by the respective devices (STEP 406). If the prices match or if price ranges are compatible, then the service component 101 may request data from the identified devices (STEP 305). Otherwise, the service component 101 may suspend the data capture 407 if no compatible devices are identified (or send requests for data capture only to the compatible devices).

The identified devices receive a request from the service component requesting data capture (STEP 306, FIG. 3). The service component 101 may further provide additional instructions for the device pertaining to the capture of data. For example, if the requestor desires images of a particular object, the service component 101 may provide a sufficient description of the desired object so that the user of the device may be able to obtain the requested data. In another example, the service component 101 may provide incentives to the users of the devices to provide the requested data. For example, the users of the devices may be unaware that payment is offered for the data. The service component 101 may inform the devices that a payment is being offered (e.g., the indication may be included in a message transmitted wirelessly from the service component to each of the identified devices). Also, the users of the devices may determine if the amount of payment is acceptable. If the amount is not acceptable (e.g., too low) to a user of a device, the user may indicate the desire for additional payment. The price may be adjusted accordingly (STEP 308) if the requestor agrees to pay the modified price. The service component 101 may report the proposed modified price to the requestor and the requestor may respond by agreeing or disagreeing to the modified price. If the requestor agrees to the modified price, the requestor transmits an acknowledgment to the service component 101. Otherwise, the requestor may transmit a message indicating the price is unacceptable and either negotiations may ensue or the data capture is not performed by the user of the device.

The service component 101 may provide many different types of incentives to users of devices to provide the requested data. In another example, the service component 101 may offer users of the devices "credit" for providing the requested data (STEP 307). For example, when a user of a device provides the requested data, the service component 101 may include a credit point to the device in the corresponding device profile. If at a subsequent time the user desires data and sends a request to the service component 101 for the desired data, the service component 101 determines that the user has accumulated credit points. The user of the device may thus be entitled to receive the desired data based on the credit points. After the desired data is delivered or transmitted to the user, the appropriate number of accumulated credit points may be deducted.

In STEP 309, the data captured by the device(s) is transmitted to the requestor by the service component 101. Thus, the mediator 204 of the service component 101 may allow a requestor to submit requests for data capture which may include any desired characteristics of the data capture such as geographical location of the data capture or subject matter of the data capture. Based on the request and the characteristics of the federated user devices in the network (e.g., location of the device, capabilities of the device, etc.), the mediator 204 of the service component 101 may transmit a request for the data capture to devices identified as capable of providing the data. Also as described, the requestor may indicate a number of devices for data capture (e.g., minimum or maximum number), a time period for the data capture, or a price.

In another example, an auction for desired data may be conducted between a requestor device and identified devices capable of providing the desired data. The auction may be of any type, for example, a basic auction, a dutch-auction, an open market auction or a multi-unit English descending auction, to name a few. In the standard auction, a requestor may request desired data and may state a price that the requestor is willing to pay. Devices identified as capable of providing the requested data may submit bids indicating the price that each of the devices is willing to accept for the requested data. Based on the bids, the requestor may select a device to provide the requested data.

In the dutch-auction example, the requester desires to pay as little as possible, but no more than $X for Y distinct samples. Each provider wants to be paid as much as possible but no less than $Z. A requestor opens the auction by stating X and Y. The providers' offers, Z, may be at any price below X. Offers may be revised or withdrawn at anytime before the auction ends. Bidding is "blind."

The mediator then manages the auction and creates a supply curve for the requestor. A strike price is selected as the lowest price on the supply curve for which Y samples may be purchased. The auction ends when time expires, reserve and other criteria are met. The Y providers with the lowest offers are each paid the strike price for each distinct sample up to Y samples. If there are not enough qualified samples with offer prices less than or equal to the strike price, the auction either fails, or may be partially filled (at requestor's choice).

Also, the auction may be held at the time of request (e.g. who is on route 520 near the shipping canal bridge right now? I'll pay up to $X for a picture of the traffic.) or may be held well in advance of sample collection (e.g. who will be in Central Park on Sunday at noon? I'll pay up to X$ for a recording of the free concert.).

In another example of an auction, a requestor and provider devices may participate in a multi-unit English descending auction. IN a multi-unit English descending auction, multiple identical items may be auctioned to multiple winning high bidders (but with descending rather than ascending bids). Device holders offer successively lower offers to win the right to fulfill one of Y transactions. Only one device may offer at a given price. The auction terminates when the Y samples can each be purchased at or below the stated maximum price and a predetermined time has elapsed and/or other criteria are met. Use of an unpublished reserve price may encourage lower bids. The qualified device holders with the lowest Y offers each win the auction at their offer price.

In yet another example of an auction, a requestor and provider devices may participate in an open market auction in which the auction may be continuous and long-lived with multiple providers and multiple requestors for a given sample "issue" entering and leaving at any time. In this variation, X becomes the "Bid" price and may be actively revised by its requestor. Fulfillment of an order occurs as soon as a supply curve can be drawn that satisfies the requestor's order quantity.

The service component 101 may identify devices capable of providing the requested data and may further transmit a bid request to the identified devices. The requested data transmitted to the requestor may further include advertisements or other promotional materials. The advertisements may accompany the requested data as additional information in a separate page, banner advertisements on the same page, or advertisements embedded in the requested data.

Figure 5:
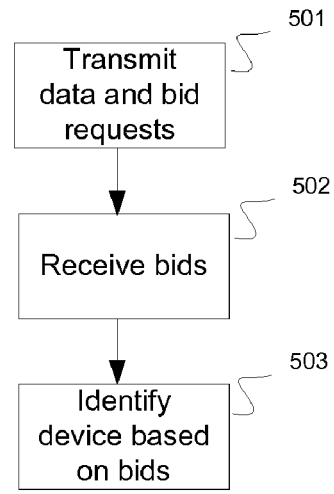
FIG. 5 is a flowchart illustrating an example of transmitting bid requests to participating devices.

FIG. 5 is a flowchart illustrating an example of transmitting bid requests to participating devices. In STEP 501, bid requests are transmitted to identified devices. Responsive to receiving the bid requests, users at each of the identified devices may transmit a bid including a price which the user of the device is willing to accept for providing the data capture. The service component 101 receives the bids (STEP 502) and may further identify devices for providing the requested data based on the bids (STEP 503). For example, the service component 101 may compare the bids received from the respective devices and compare the received bids to a price indicated by the requestor as the price the requestor is willing to pay for the data. If the prices match, the device may be identified as a device for providing the desired data capture.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. An intermediary system for mediating requests between users of devices, the intermediary system comprising:
    a data storage component to store the location of at least one device;
    a tracking component to maintain a location of the at least one device;
    a request input component for receiving a user request from a requestor for data capture, the user request comprising a desired result;
    a mediator component to access the data storage component to obtain device location, the desired location corresponding to the desired result, to identify the at least one device as capable of providing the data capture based on the location of the at least one device, the mediator component generating a request to capture data for the at least one device identified as capable of providing the data capture in response to the user request, the request to capture data comprising additional instructions pertaining to the capture of data to achieve the desired result, wherein a user of at least one of the at least one device is made aware of the desired result when the request is received by the user; and
    an output component to transmit a reply to the requestor, the reply comprising data captured by the identified at least one device in response to the request to capture data.

2. The system of claim 1, wherein the user request comprises a location for the data capture.

3. The system of claim 1, further comprising an input component for receiving a message from the identified at least one device responsive to transmitting a request generated by the mediator component, wherein the user request comprises a location for the data capture and wherein the identified at least one device is identified based on proximity to the location.

4. A method of soliciting data capture from a plurality of devices, the method comprising:
    tracking locations of the devices;
    storing locations of the devices;
    receiving a request from a requestor, the request including a geographical location and a desired result, the request comprising a request for data capture;
    determining, in response to the request, at least one device for providing the data capture, the determining comprising identifying the at least one device as being in the vicinity of the geographical location; and
    sending a message to the at least one determined device based on the determining, the message requesting the device to sense data, the message comprising additional instructions pertaining to the capture of data to achieve the desired result, wherein a user of at least one of the at least one determined device is made aware of the desired result when the message is received by the user.

5. The method of claim 4 wherein the request includes a minimum number of devices for capturing the data.

6. The method of claim 5 wherein the determining includes identifying a number of devices capable of capturing the data, and wherein the sending includes sending the message to the number of devices capable of capturing the data if the number of devices capable of capturing the data is greater than or equal to the minimum number of devices for capturing the data in the request.

7. The method of claim 4, wherein the request includes a time period over which the request is valid.

8. The method of claim 7, wherein the sending includes sending the message if the time period has not elapsed.

9. The method of claim 4, wherein the request includes a price and wherein the determining includes identifying a device for providing the data capture for the price.

10. The method of claim 4, further comprising receiving a bid from the at least one device.

11. The method of claim 10, wherein the determining includes identifying the at least one device based on the bid.

12. The method of claim 4, further comprising:
    receiving the data from the device; and
    assigning a credit to the at least one device.

13. The method of claim 4, further comprising sending the data capture from the at least one determined device to the requestor.

14. The method of claim 4, further comprising:
obtaining at least one property of the request from the requestor;
determining a cost-benefit analysis based on the at least one property,
wherein the sending step includes sending the message based on the cost-benefit analysis.

15. A method of soliciting data capture from a plurality of federated mobile devices, the method comprising:
tracking locations of the federated mobile devices
storing the locations of the devices in a data storage;
receiving a request from a requestor, the request comprising a request for data capture of a specific result, wherein the specific result is an object, an item, a scene, a location, or an answer to a natural language query;
determining at least one device for providing the data capture;
sending a message to the at least one determined federated mobile device, the message requesting the device to sense data, a user of the federated device being made aware of the presence of the desired specific result as a result of the message, the message further comprising additional instructions to assist the user of the federated device to identify the desired specific result;
receiving captured data in response to the sent message;
transmitting a result to the requestor, the result based on the received captured data.

16. The system of claim 1, wherein the specific desired result is captured data corresponding to an object, item, subject matter, scene, location, or answer to a natural language query.

17. The system of claim 1, wherein the additional instructions comprise a description of the desired result.

18. The system of claim 1, wherein the additional instructions comprise a direction in which to face in order to obtain the data corresponding to the specific desired result.

19. The method of claim 4, wherein the desired result is captured data corresponding to an answer to a natural language query.

20. The system of claim 1, wherein the additional instructions comprise at least one of (a) a description of the desired result, and (b) a direction in which to face in order to obtain the data corresponding to the desired result.

* * * * *